Patented July 17, 1928.

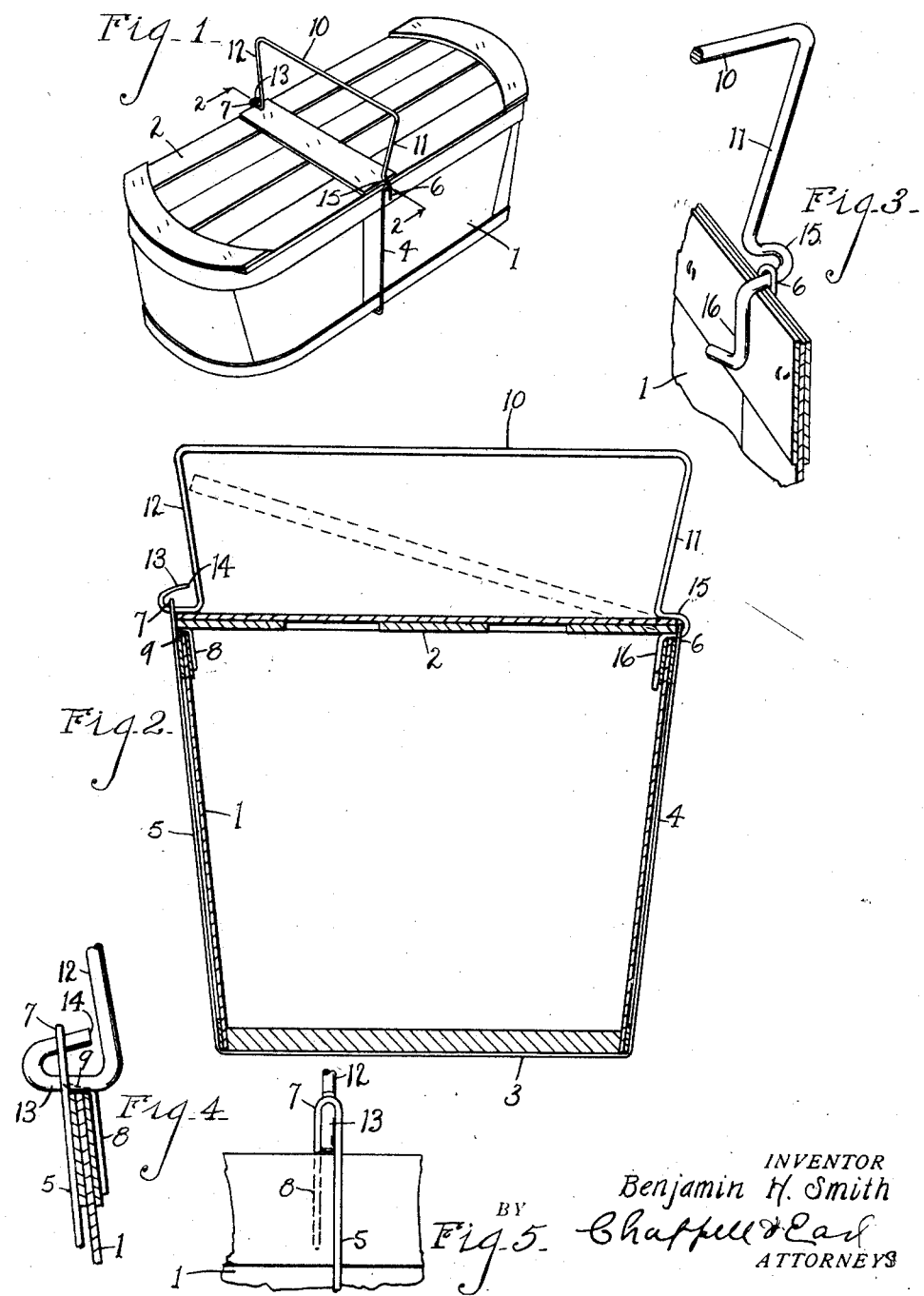

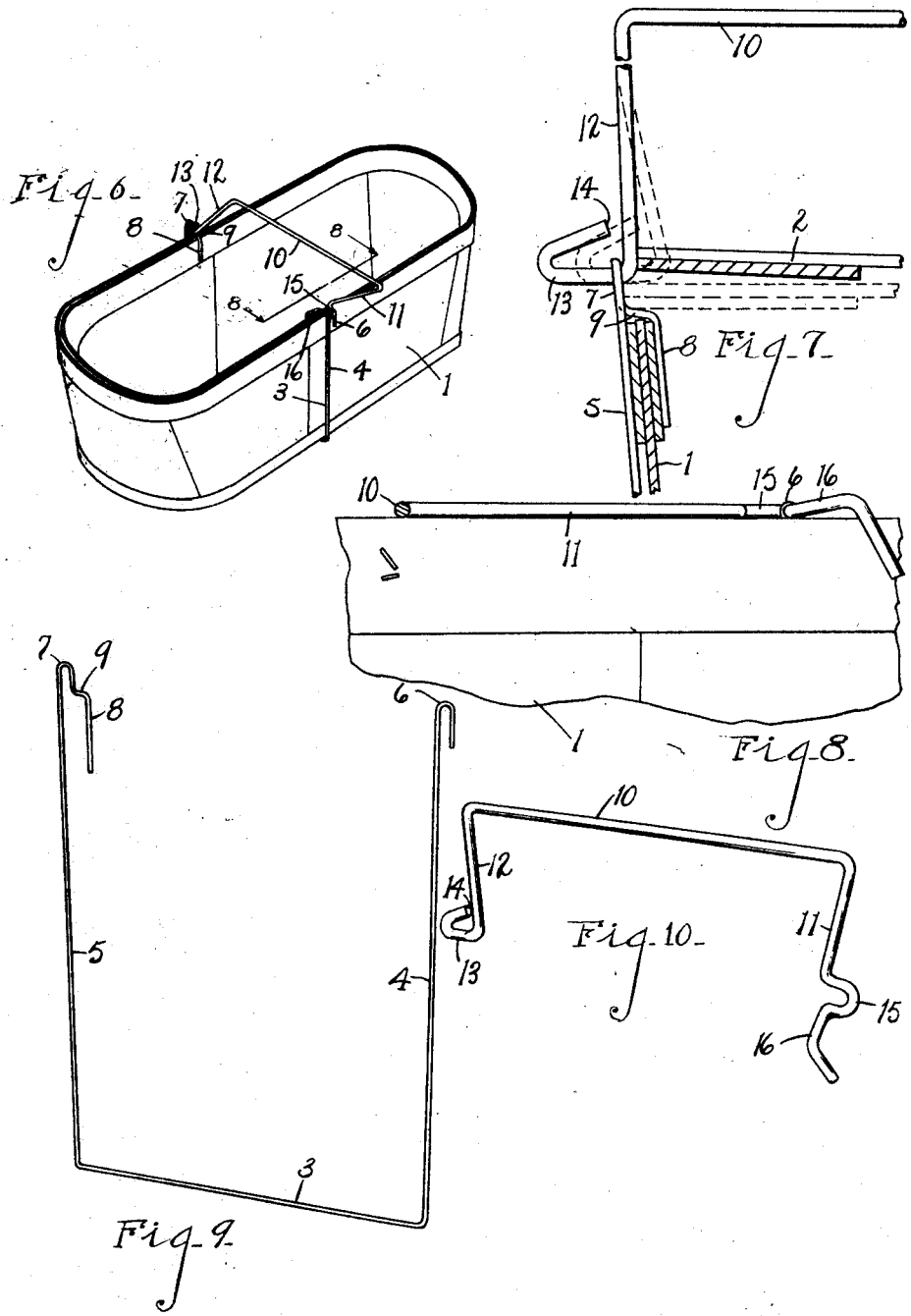

1,677,152

UNITED STATES PATENT OFFICE.

BENJAMIN H. SMITH, OF NILES, MICHIGAN, ASSIGNOR TO MICHIGAN WIRE GOODS COMPANY, OF NILES, MICHIGAN.

BASKET HANDLE.

Application filed April 21, 1927. Serial No. 185,465.

The main objects of this invention are:

First, to provide an improved basket handle for fruit baskets and the like which may be quickly attached and constitutes a cover holding means permitting the convenient attaching and removal of the cover, the handle being operative or effective with or without the cover.

Second, to provide a basket handle of the class described in which the handle may be collapsed when the cover is removed.

Third, to provide a handle having these advantages which when once assembled and attached is securely retained, it being removed only with the aid of tools.

Fourth, to provide a handle having these advantages which is economical in material and production.

Objects pertaining to details and economies of my invention will definitely appear from the detailed description to follow. The invention is defined in the claims.

A structure embodying the features of my invention is clearly illustrated in the accompanying drawing, in which:

Fig. 1 is a perspective view of a basket with one of my improved handles applied thereto.

Fig. 2 is a vertical cross section on line 2—2 of Fig. 1.

Fig. 3 is a fragmentary perspective view with the cover removed.

Fig. 4 is a detail sectional view illustrating one step in assembling.

Fig. 5 is a fragmentary view looking from the left of Fig. 4.

Fig. 6 is a perspective view with the cover removed and the handle in collapsed position.

Fig. 7 is a detail section illustrating the manner of applying or removing the cover.

Fig. 8 is a fragmentary view on line 8—8 of Fig. 6 showing the relation of parts when the handle is collapsed.

Fig. 9 is a perspective view of the body engaging bail member.

Fig. 10 is a perspective view of the handle member.

Referring to the drawing, 1 represents the body member and 2 the cover of a conventional type of fruit basket. My improved handle comprises a body embracing bail member 3 having arms 4 and 5, the arm 4 terminating in a hook 6 and the arm 5 terminating in a hook 7. These hooks are disposed in planes parallel with the sides of the basket, the hook 7 projecting above the rim of the basket farther than the hook 6, the purpose of which will appear as the description proceeds.

The bill of the hook 7 has an inwardly offset extension 8 engaging within the rim of the basket, the shoulder 9 formed by the offset resting on the rim. The handle 10 is formed of resilient wire and has downwardly converging arms 11 and 12. The arm 12 has an outwardly projecting eye 13 disposed in the plane of the handle and adapted to be inserted bodily through the eye formed by the hook 7 as indicated in Figs. 4 and 5, the eye being open at 14 to receive the eye of the bail as shown in Figs. 2 and 7.

This outwardly offset eye forms a cover engaging shoulder at the base of the arm 12, the eye being of such length as to permit lateral springing of the arm as is indicated in Fig. 7 where the arm is shown in its outer position by full lines and in its normal position by dotted lines.

The arm 11 of the handle has an outwardly offset loop 15 formed therein engaged in the hook 6 which projects above the rim of the basket sufficiently to receive the loop as clearly shown in Fig. 3.

The loop 15 has an angled finger 16 extending downwardly therefrom and engaging on the inner side of the rim, see Figs. 2, 3 and 8. This finger 16 supports the handle laterally so that when the edge of the cover is engaged in the loop 15 as shown in Fig. 2 the opposite edge of the cover may be pushed down, swinging the arm 12 outwardly as shown in Fig. 7 until the edge of the cover passes below the eye in the arm when the arm springs back to engage the cover as shown in Figs. 1 and 2. The cover may be readily removed by a reverse operation.

When the cover is removed the handle may be swung down and collapsed as shown in Figs. 6 and 8. The angled extension 16 prevents the disengagement of the handle from the eye 13. It is necessary to compress the eye 13 in order to disengage it from the eye 7 and this ordinarily requires the aid of a tool, so the handle may be said to be permanently retained on the basket.

This security is a very desirable feature as these fruit baskets are handled in large quantities by the transportation company and security of the handle results in minimizing loss in handling. There is further the matter of the ease with which the cover may be attached and detached.

I have illustrated and described my improvements as adapted to a well-known type of basket. The structure may be readily adapted for various types of receptacles.

Having thus described my invention what I claim as new and desire to secure by Letters Patent is:

1. The combination with a receptacle and cover, of a receptacle bail having arms terminating in hooks disposed in the planes parallel with the sides of the receptacle, one of the hooks being elongated and its bill being inwardly offset and engaged within the rim of the receptacle, and a resilient handle having downwardly converging arms, one of the arms terminating in an outwardly projecting vertically disposed eye engaged in said elongated hook for pivotal movement and to permit lateral springing of the arm, the eye constituting a cover engaging shoulder and being engageable with said elongated hook by passing bodily through the hook above the rim of the receptacle, the other arm having an outwardly offset loop pivotally engaged in the other hook of the bail and terminating in a downwardly projecting angled retaining finger engaging within the rim of the receptacle whereby the handle is retained for pivotal movement and supported laterally, said loop in said handle being adapted to receive one edge of the cover, the other edge of the cover being disposed between the rim of the basket and said cover engaging shoulder.

2. The combination with a receptacle and cover, of a receptacle bail having arms terminating in hooks disposed in the planes parallel with the sides of the receptacle, one of the hooks being elongated and its bill being inwardly offset and engaged within the rim of the receptacle, and a handle having downwardly converging arms, one of the arms terminating in an outwardly projecting vertically disposed eye engaged in said elongated hook to permit lateral springing of the arm, the eye constituting a cover engaging shoulder and being engageable with said elongated hook by passing bodily through the hook above the rim of the receptacle, the other arm having an outwardly offset loop pivotally engaged in the other hook of the bail and terminating in a downwardly projecting retaining finger engaging within the rim of the receptacle, said loop in said handle being adapted to receive one edge of the cover, the other edge of the cover being disposed between the rim of the basket and said cover engaging shoulder.

3. The combination with a receptacle and cover, of a receptacle bail having arms terminating in hooks disposed in the planes parallel with the sides of the receptacle, one of the hooks being elongated and its bill being inwardly offset and engaged within the rim of the receptacle, and a handle having downwardly converging arms, one of the arms terminating in an outwardly projecting vertically disposed eye engaged in said elongated hook, the other arm having an outwardly offset loop pivotally engaged in the other hook of the bail and terminating in a downwardly projecting retaining finger engaging within the rim of the receptacle, said loop in said handle being adapted to receive one edge of the cover, the other edge of the cover being disposed between the rim of the basket and said eye on said handle.

4. The combination with a receptacle and cover, of a receptacle bail having arms terminating in eyes, one of the eyes being elongated and having an inwardly offset extension engaged within the rim of the receptacle, and a resilient handle having downwardly converging arms, one of the arms terminating in an outwardly projecting eye engaged in said elongated eye of said bail for pivotal movement and to permit lateral springing of the arm and constituting a cover engaging shoulder, the other arm having an outwardly offset loop pivotally engaged in the other eye of the bail and terminating in a downwardly projecting angled retaining finger engaging within the rim of the receptacle, said loop in said handle being adapted to receive one edge of the cover, the other edge of the cover being disposed between the rim of the basket and said cover engaging shoulder.

5. The combination with a receptacle and cover, of a receptacle bail having arms terminating in eyes, one of the eyes being elongated and having an inwardly offset extension engaged within the rim of the receptacle, and a handle having arms, one of the arms terminating in an eye engaged in said elongated eye of said bail, the other arm having an outwardly offset loop pivotally engaged in the other eye of the bail and terminating in a downwardly projecting retaining finger engaging within the rim of the receptacle, said loop in said handle being adapted to receive one edge of the cover, the other edge of the cover being disposed between the rim of the basket and said eye on said handle.

6. The combination with a receptacle and cover, of a receptacle bail having arms terminating in eyes, one of the eyes having an extension engaged within the rim of the receptacle, and a resilient handle having downwardly converging arms, one of the arms terminating in an outwardly projecting eye engaged in said eye of said bail having the extension for pivotal movement and to permit lateral springing of the arm and constituting a cover engaging shoulder, the other arm having an outwardly offset loop pivotally engaged in the other eye of the bail and terminating in a downwardly projecting angled retaining finger engaging within the rim of the receptacle, said loop in said handle being adapted to receive one edge of the cover, the other edge of the cover being disposed between the rim of the basket and said cover engaging shoulder.

7. The combination with a receptacle of a receptacle bail having arms terminating in eyes, one of the eyes having an extension engaged within the rim of the receptacle, and a handle having inwardly converging arms, one of the arms terminating in an outwardly projecting eye engaged in said eye of said bail having the extension, the other arm having an outwardly offset loop pivotally engaged in the other eye of the bail and terminating in a downwardly projecting angled retaining finger engaging within the rim of the receptacle.

8. The combination of a receptacle engaging bail having arms terminating in hooks, one of the hooks being elongated and its bill being inwardly offset to engage within the rim of a receptacle, and a resilient handle having downwardly converging arms, one of the arms terminating in an outwardly projecting eye engageable with said elongated hook for pivotal movement and to permit lateral springing of the arm, the eye constituting a cover engaging shoulder, the other arm having an outwardly offset loop engageable in the other hook of the bail and terminating in a downwardly projecting angled retaining finger engageable within the rim of a receptacle, said loop in said handle being adapted to receive one edge of the cover.

In witness whereof I have hereunto set my hand.

BENJAMIN H. SMITH.